(No Model.)
N. T. WHITING.
ELEVATED WATER TANK.
No. 288,901. Patented Nov. 20, 1883.
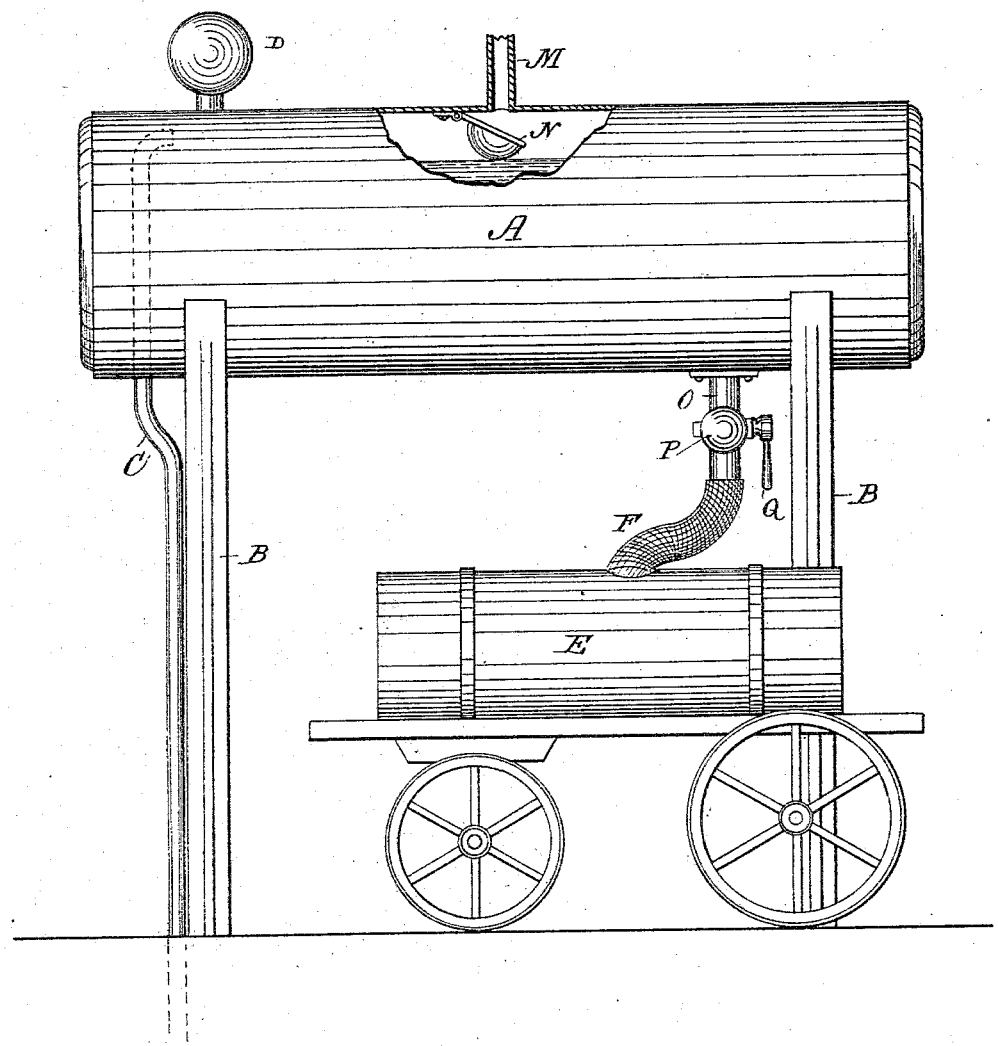
WITNESSES:
W. W. Hollingsworth
A. G. Lyne
INVENTOR:
N. T. Whiting
BY Munn & Co
ATTORNEYS.

UNITED STATES PATENT OFFICE.

NATHANIEL T. WHITING, OF SAN FRANCISCO, CALIFORNIA.

ELEVATED WATER-TANK.

SPECIFICATION forming part of Letters Patent No. 288,901, dated November 20, 1883.

Application filed July 24, 1883. (No model.)

*To all whom it may concern:*

Be it known that I, NATHANIEL T. WHITING, of San Francisco, in the county of San Francisco and State of California, have invented a new and useful Improvement in Elevated Water-Tanks, of which the following is a full, clear, and exact description, reference being had to the annexed drawing, forming part of this specification.

This invention relates to elevated tanks for filling street-sprinkling wagons with water; and the invention consists of the construction hereinafter described and claimed.

The drawing is a side elevation of a tank and sprinkling-wagon, the former being partly broken away, and showing my invention.

A is a tank resting on suitable supports, B B. The tank is to be made of wood or iron, and entirely closed, with the exception of the vent-pipe M, and is to be made of sufficient strength to resist the pressure in the water-main under the street, from which it is supplied with water through the pipe C.

N is a check or flap valve secured to the roof of the tank, in position for closing the vent-pipe M automatically by the rising of the water in the tank through the pipe C. The under side of the valve is made convex, in order that when the tank is full it may be embedded in the water and held firmly closed to prevent overflow. The convex under side, however, may be omitted, if desired. As an outlet for the water, I provide a metallic pipe, O, arranged in the bottom of the tank, and provided with a cock, P, and lever Q, or with a wheel and screw-valve for opening and closing the pipe. A short hose, F, communicating with the water-receptacle on the sprinkling-wagon E, is to be attached to the lower end of pipe O for filling the receptacle from the tank.

D is an air-chamber on top of the tank, to prevent the entire exclusion of air from the tank when the latter is filled with water.

What I claim is—

The elevated water-tank having the inlet-pipe C, the vent-pipe M, and convex check-valve N, adapted to close said pipe M, the air-chamber D, and the outlet-pipe O, having cock P and lever Q, substantially as shown and described.

NATHANIEL TRUMAN WHITING.

Witnesses:
J. C. S. RICHARDSON,
X. N. STEEVES.